(12) United States Patent
Kim

(10) Patent No.: US 10,069,117 B2
(45) Date of Patent: Sep. 4, 2018

(54) SECONDARY BATTERY

(75) Inventor: Dae-Kyu Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 955 days.

(21) Appl. No.: 13/561,971

(22) Filed: Jul. 30, 2012

(65) Prior Publication Data

US 2013/0183556 A1  Jul. 18, 2013

(30) Foreign Application Priority Data

Jan. 16, 2012  (KR) ........................ 10-2012-0004833

(51) Int. Cl.

| H01M 2/02 | (2006.01) |
|---|---|
| H01M 2/12 | (2006.01) |
| H01M 4/00 | (2006.01) |
| H01M 2/04 | (2006.01) |
| H01M 10/04 | (2006.01) |
| H01M 2/08 | (2006.01) |

(52) U.S. Cl.
CPC ......... *H01M 2/022* (2013.01); *H01M 2/0285* (2013.01); *H01M 2/0413* (2013.01); *H01M 2/0417* (2013.01); *H01M 10/0431* (2013.01); *H01M 2/08* (2013.01); *H01M 2/12* (2013.01)

(58) Field of Classification Search
None
See application file for complete search history.

(56) References Cited

U.S. PATENT DOCUMENTS

| 2009/0011329 A1 | 1/2009 | Yoon |
|---|---|---|
| 2009/0087733 A1* | 4/2009 | Yoon ..................... H01M 2/263 429/178 |
| 2010/0151317 A1 | 6/2010 | Kim et al. |

FOREIGN PATENT DOCUMENTS

| KR | 10-0865405 B1 | 10/2008 |
|---|---|---|
| KR | 10-2008-0099889 A | 11/2008 |
| KR | 10-2009-0003702 A | 1/2009 |
| KR | 10-0922352 B2 | 10/2009 |
| KR | 10-2010-0068080 A | 6/2010 |

OTHER PUBLICATIONS

Korean Notification of Reason for Refusal dated Nov. 16, 2017 for Korean Patent Application No. KR 10-2012-0004833, which cites the above-identified references numbered 2-3, and from which priority is claimed by subject U.S. Appl. No. 13/561,971.

Korean Registration Determination Certificate dated Jun. 1, 2018 for Korean Patent Application No. KR 10-2012-0004833, which cites the above-identified reference numbered 1, and from which priority is claimed by subject U.S. Appl. No. 13/561,971.

* cited by examiner

*Primary Examiner* — Ladan Mohaddes

(74) *Attorney, Agent, or Firm* — Knobbe Martens Olson & Bear LLP

(57) ABSTRACT

In one aspect, a secondary battery capable of preventing a damage of an electrode assembly by preventing the electrode assembly from contacting an inside protrusion portion of a case when subjected to a shock or vibration is provided.

19 Claims, 4 Drawing Sheets

SECONDARY BATTERY

CROSS-REFERENCE TO RELATED APPLICATION

This application claims priority to and the benefit of Korean Patent Application No. 10-2012-0004833, filed on Jan. 16, 2012, in the Korean Intellectual Property Office, the disclosure of which is incorporated in its entirety herein by reference.

BACKGROUND

Field

This disclosure relates to a secondary battery, more particularly, a secondary battery with improved stability.

Description of the Related Technology

Demand for a secondary battery as an energy source is increasing sharply as technology development and demand for mobile devices increases. A secondary battery is being included in digital devices such as mobile phones, laptops, digital cameras, and power tools, traditional scooters (e-bike) etc.

Secondary batteries are roughly classified into a cylindrical battery, a square battery and a pouch type battery according to external and internal structural features. In addition, secondary batteries are classified into a jelly-roll type and a stack type according to the structures of a positive pole, a separator and a negative pole configuring the secondary battery.

Electrode active material is coated into a metal foil using as a collector in the jelly-roll type electrode assembly, the coated foil is dried and pressed, and then, is cut in a band type having a regular width and length. The jelly-roll type electrode assembly is mainly used in the cylindrical battery, in some cases, is compressed as a flat-type and is also applied to the square or pouch type battery.

In general, the cylindrical secondary battery inserts the jelly-roll type electrode assembly into a cylindrical case.

SUMMARY

Some embodiments provide a secondary battery, comprising an electrode assembly including a first electrode plate, a second electrode plate, and a separator interposed between the first electrode plate and the second electrode plate; a case housing the electrode assembly and including an inside protrusion portion formed in the position corresponding to an outer circumference of a top end of the electrode assembly; a cap assembly coupled with the top of the case; and an upper insulating member between the electrode assembly and the cap assembly, wherein the upper insulating member is formed with an upper side surface extension portion extended by from about 0.8 mm to about 1.5 mm toward the a side surface of the electrode assembly facing an inside surface of the case from the an outermost region of the upper insulating member.

Some embodiments provide a secondary battery capable of preventing damage of an electrode assembly by preventing the electrode assembly from contacting the inside protrusion portion of a case when subjected to a shock or vibration by protecting the outermost of the top and bottom of an electrode assembly by an insulating member.

In certain embodiments, the secondary battery includes an electrode assembly including a first electrode plate, a second electrode plate, and a separator interposed between the first electrode plate and the second electrode plate; a case housing the electrode assembly and including an inside protrusion portion formed in the position corresponding to an outer circumference of a top end of the electrode assembly; a cap assembly coupled with the top of the case; and an upper insulating member between the electrode assembly and the cap assembly, wherein the upper insulating member is formed with an upper side surface extension portion extended by about 0.8 mm to about 1.5 mm toward the side surface of the electrode assembly facing an inside surface of the case from the outermost of the upper insulating member.

In certain embodiments, a thickness of the upper side surface extension portion may be formed thinner than that of the upper insulating member.

In certain embodiments, the thickness of the upper side surface extension portion may be formed in the range of from about 0.1 mm to about 0.5 mm.

In certain embodiments, the upper side surface extension portion may surround the circumference of the top side surface of the electrode assembly in a bottom of the inside protrusion portion.

In certain embodiments, the upper side surface extension portion may be inclined so that the surface facing the electrode assembly is gradually spaced apart from the electrode assembly toward the bottom thereof.

In certain embodiments, the materials of the upper side surface extension portion and the upper insulating member may contain polypropylene.

In certain embodiments, the secondary battery may further include a lower insulating member between the electrode assembly and the bottom surface of the case, wherein a lower side surface extension portion extended toward the side surface of the electrode assembly from the outermost of the lower insulating member may be formed in the secondary battery.

In certain embodiments, the lower side surface extension portion may be extended by about 0.8 mm to about 1.5 mm.

In certain embodiments, the thickness of the upper side surface extension portion may be formed in the range of from about 0.1 mm to about 0.5 mm.

Some embodiments provide a secondary battery, comprising an electrode assembly, a second electrode plate, and a separator interposed between the first electrode plate and the second electrode plate; a case housing the electrode assembly; a cap assembly coupled with the top of the case; and an upper insulating member between the electrode assembly and the cap assembly; wherein the upper insulating member is formed with an upper side surface extension portion extended toward the side surface of the electrode assembly facing an inside surface of the case from the outermost of the upper insulating member.

In certain embodiments, the thickness of the upper side surface extension portion may be formed in the range of from about 0.1 mm to about 0.5 mm.

In certain embodiments, the upper insulating member may be formed with an upper side surface extension portion extended by from about 0.8 mm to about 1.5 mm toward a side surface of the electrode assembly facing an inside surface of the case from an outermost region of the upper insulating member.

In certain embodiments, the secondary battery may further comprise a crimping portion extended from the inside protrusion.

In certain embodiments, the cap assembly may include a safety vent and a circuit substrate.

In certain embodiments, the safety vent may be connected to a positive or negative tab.

In certain embodiments, the safety vent may be configured to release internal gas pressure.

BRIEF DESCRIPTION OF THE DRAWINGS

The accompanying drawings illustrate exemplary embodiments of the present disclosure.

DETAILED DESCRIPTION

Figure 1:
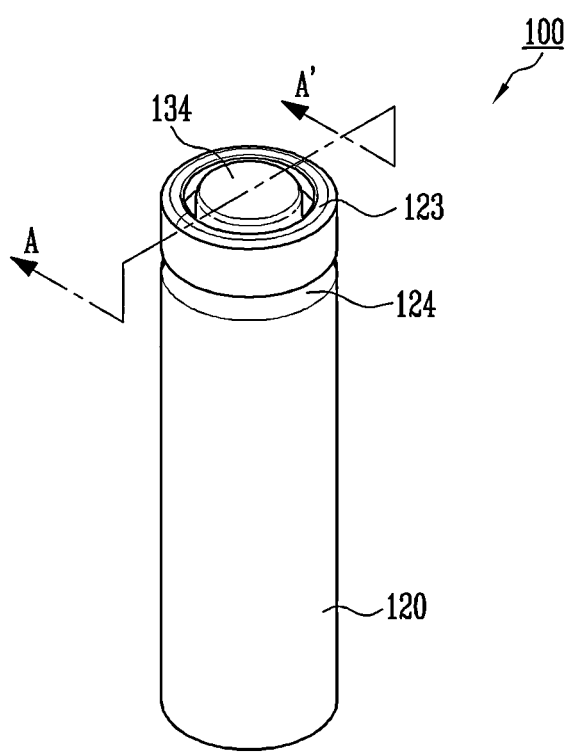
FIG. 1 is a perspective view showing a cylindrical lithium secondary battery according to one embodiment.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" an element, it can be directly on the element or be indirectly on the element with one or more intervening elements interposed therebetween. Also, when an element is referred to as being "connected to" an element, it can be directly connected to the element or be indirectly connected to the element with one or more intervening elements interposed therebetween.

It is appreciated that the present embodiments can be carried out in other specific forms without changing a technical idea or essential characteristics by one having ordinary skilled in the art to which the present disclosure pertains. Therefore, embodiments described above are for illustration but are not limited thereto.

Hereinafter, like reference numerals refer to like elements. In addition, the thickness or size of each layer in the drawing may be exaggerated for the sake convenience of description and clarity, and may differ from actual size and thickness of the layer.

Figure 2:
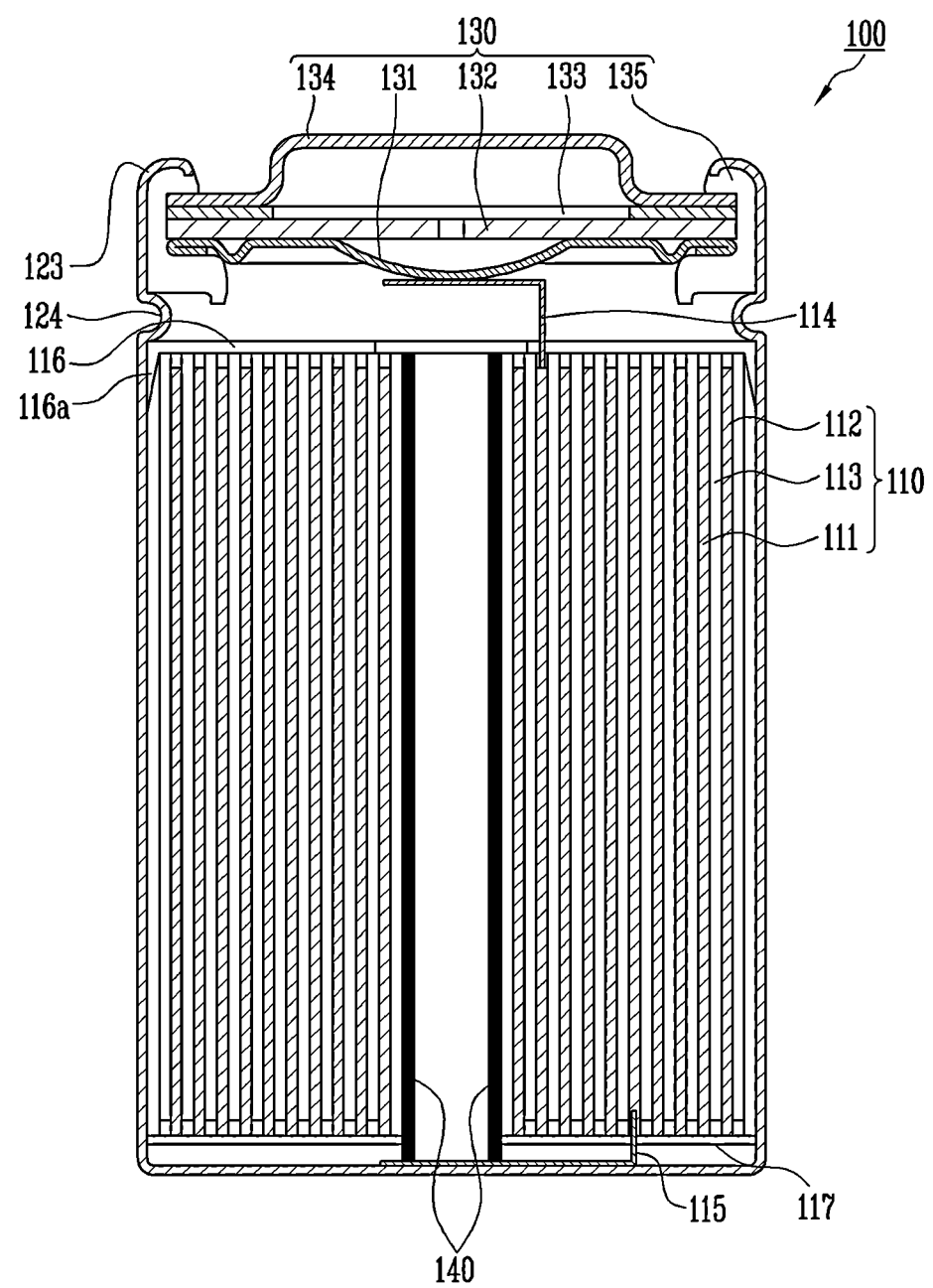
FIG. 2 is a cross-sectional view taken by line A-A' of FIG. 1.

FIG. 1 is a perspective view showing a cylindrical lithium secondary battery according to one embodiment, and FIG. 2 is a cross-sectional view taken by line A-A' of FIG. 1.

Referring to FIGS. 1 and 2, the cylindrical lithium secondary battery 100 includes an electrode assembly 110 generating voltage difference when charging and discharging, a case 120 housing the electrode assembly 110, a cap assembly 130 assembled into a top of the case and allowing the electrode assembly 110 not to deviate, and an electrolyte injected into the case 120 and allowing lithium ions to move between electrode assemblies 110.

The electrode assembly 110 includes a negative plate 112, a positive plate 111, and a separator 113 interposed between the negative plate 112 and the positive plate 111. In some embodiments this configuration can prevent a short circuit, and allow only the lithium ions to move. In certain embodiments, the negative plate 112 may be coated with a negative active material such as graphite or carbon, and the positive plate 111 may be coated with positive active material of transition metal oxide such as $LiCoO_2$, $LiNiO_2$, or $LiMn_2O_4$. The negative plate 112, the positive plate 111, and the separator 113 are wound in a roughly jelly roll type configuration, and are housed in the case 120.

In certain embodiments, the negative plate 112 may be copper foil, the positive plate 111 may be aluminum foil, the separator may be polyethylene or polypropylene, but the material is not limited thereto. In certain embodiments, the negative plate 112 may be welded with a negative tab 115 protruded and extended at a regular length from a bottom thereof, and the positive plate 111 may be welded with a positive tab 115 protruded at a regular length from a the top thereof. In certain embodiments, it may be possible to form a positive pole and a negative pole reversely. In certain embodiments, the negative tab 115 may be made of nickel (Ni) material, and the positive tab 114 may be made of aluminum (Al) material, but is not limited thereto.

In certain embodiments, the electrode assembly 110 is wound in a type of cylindrical jelly roll, and a center of the electrode assembly 110 may be formed with a constant space. In certain embodiments, the constant space may be positioned with a center pin 140 in a shape of a crossbar formed having a hollowness. In certain embodiments, the wound electrode assembly 110 is not unwound by the center pin 140. In certain embodiments, the bottom end of the center pin 140 may press the negative tab 115 to adhere the negative tab 115 to the case 120. In certain embodiments, the electrode assembly may be inserted into the case by the center pin 140, and a center space thereof is inserted with the center pin, such that the negative tab may be adhered to the case by the center pin and the center pin prevents the jelly roll from loosening and unwinding.

The case 120 may be a roughly cylindrical type, the cylindrical surface having a regular diameter may be formed in the case 120, the bottom of the cylindrical surface may be formed with a bottom surface of a disc type roughly and the top thereof may be opened. In certain embodiments, the electrode assembly 110 may be inserted into the inside thereof through the top of the cylindrical case 120. In certain embodiments, the negative tab 115 of the electrode assembly 110 may be welded to the bottom surface of the cylindrical case 120, and therefore, the cylindrical case 120 may operate as the negative pole. In certain embodiments, inversely, the positive tab 114 may be welded to the bottom surface of the cylindrical case 120. In certain embodiments, the cylindrical case 120 may operate as the positive pole.

In certain embodiments, the top surface of the electrode assembly 110 may be positioned with an upper insulating member 116, and the bottom surface thereof may be positioned with a lower insulation member 117, respectively. Thus, an unnecessary electrical short circuit between the electrode assembly 110 and the cylindrical case 120 may be prevented. In certain embodiments, the cylindrical case may be made of stainless steel, aluminum (Al) or its equivalent, but the material is not limited thereto.

In certain embodiments, the top end of the cylindrical case 120 may be formed with a crimping portion 123 bended into the inside. In certain embodiments, the crimping portion 123 may press the cap assembly 130 to be coupled later. In certain embodiments, the cylindrical case 120 may be formed with the inside protrusion portion 124 in the position corresponding to the outer circumference of the top end of the electrode assembly 110. In certain embodiments, the inside protrusion portion 124 may presses the cap assembly 130 in the top direction from the bottom thereof so that the electrode assembly 110 does not deviate from the top thereof. In certain embodiments, it is desirable that the thickness of the inside protrusion portion 124 is thicker than that of the cylindrical case 120. This can improve the stability of the process when forming the inside protrusion portion 124.

In certain embodiments, the crimping portion 123 and the inside protrusion portion 124 function to securely fix and support tight the cap assembly 130 to the cylindrical surface of the cylindrical case 120, and prevent the electrolyte from leaking. In certain embodiments, the inside protrusion portion 124 may suppress the electrode assembly 110 from moving vertically.

In certain embodiments, the cap assembly 130, coupled with the top of the cylindrical case 120, may include a safety vent 131, a circuit substrate 132, a positive temperature coefficient plate 133, a cap 134 and an insulating gasket 135. In certain embodiments, the safety vent 131 may be connected with the positive tab 114. Inversely, the safety vent 131 may be connected with the negative tab 115. The safety vent 131 is designed to be deformed or burst when the internal pressure of the case 120 rises, and damages the circuit substrate 132 on the top thereof or emits the gas into the outside. At this time, the circuit substrate 132 is damaged and blocks the current flowing into the inside of the battery.

Further, the top of the circuit substrate 132 is positioned with the positive temperature coefficient 133 blocking the current when overcurrent occurs. Further, the top of the positive temperature coefficient plate 133 is positioned with a conductive cap 134 providing the positive voltage (or the negative voltage) to the outside and formed with a number of through holes to easily emit the gas. Since the region, in which the safety vent 131, the circuit substrate 132, the positive temperature coefficient plate 133 and the cap 134 contact the case 120, is surrounded by the insulating gasket 135, a direct short circuit between the case 120 and them is not generated.

The electrolyte functions as moving media of the lithium ion produced by electrochemical reactions in the positive and negative pole of the inside of the battery when charging and discharging. In certain embodiments, the electrolyte may be non-aqueous quality gauge organic electrolyte, that is, mixture of lithium salt and high-purity organic solvents. In certain embodiments, the electrolyte may be polymer using a macromolecule electrolyte, but the type of the electrolyte material is not limited.

In certain embodiments, an upper insulating member 116 of the cylindrical secondary battery 100 may be formed with an upper side surface extension portion 116a extended by a regular length toward the side surface of the electrode assembly 110 from the outermost thereof. In certain embodiments, the upper side surface extension portion 116a may surround the circumference of the top side surface of the electrode assembly 110. Thus, when shock or vibration occurs in the battery, although the electrode assembly 110 is moved vertically and bumped into the inside protrusion portion 124 of the case 120, damage of the electrode assembly 110 may be prevented. In certain embodiments, drops of the negative plate 112 in the perimeter of the electrode assembly 110 may be prevented since the top side surface of the electrode assembly 110 is covered by the upper side surface extension portion 116a.

In certain embodiments, the upper side surface extension portion 116a may be inclined so that the surface facing the electrode assembly 110 is gradually spaced apart from the electrode assembly 110 toward the bottom thereof. For example, a beginning portion of the upper side surface extension portion 116a of the upper insulating member 116 may contact the electrode assembly 110, and may be gradually spaced apart from the electrode assembly 110 toward the end of the upper side surface extension portion 116a far from the upper insulating member 116. In certain embodiments, the upper side surface extension portion 116a may be easily inserted while surrounding the top side surface of the electrode assembly when the upper insulating member 116 is seated on the top of the electrode assembly 110. That is, it is possible to easily insert the upper side surface extension portion 116a of the upper insulating member 116 into the top of the electrode assembly 110 without press-fitting.

In certain embodiments, the materials of the upper insulating member 116 and the upper side surface extension portion 116a formed integrally may contain polypropylene.

Figure 3:
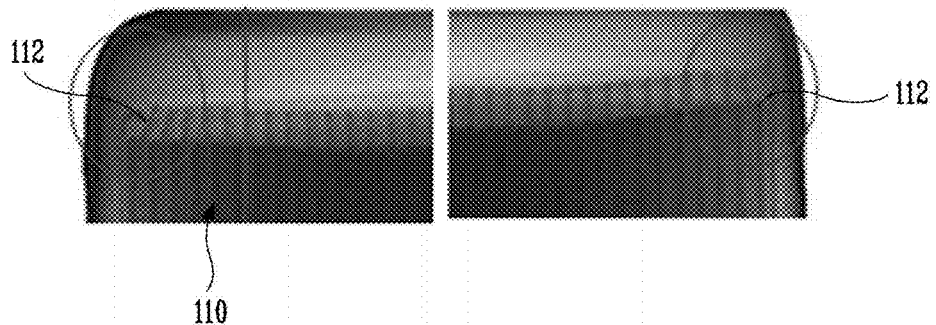
FIG. 3 is a photo showing a damaged state for a top of an electrode assembly inserted into the inside of the cylindrical lithium secondary battery.

FIG. 3 is a photo showing a damaged state for a top of an electrode assembly inserted into the inside of the cylindrical secondary battery that may be prevented by implementing embodiments as disclosed herein.

Referring to FIG. 3, when the upper side surface extension portion 116a is omitted from the upper insulating member 116, it may be verified that the negative plate 112 in the outermost of the top of the electrode assembly 110 is bent. When a shock is applied to the secondary battery from the outside, the electrode assembly 110 is bumped into the inside protrusion portion 124 of the case 120 by vertically moving the electrode assembly 110 in the inside of the case 120, and therefore, a negative plate 112 is damaged as shown FIG. 3. This damage may be prevented by implementing embodiments as disclosed herein.

In certain embodiments, the upper insulating member 116 may be formed with the upper side surface extension portion 116a to prevent the damage of the negative plate 112 as discussed with reference to FIG. 4 and table 1.

Figure 4:
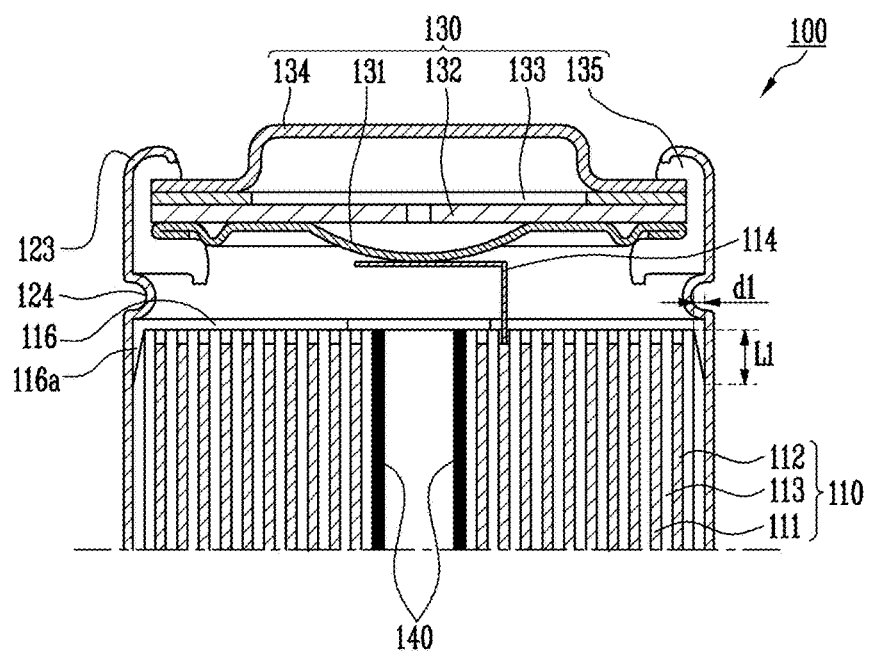
FIG. 4 is a cross-sectional view showing a thickness and a length for a side surface extension portion of an insulation member according to one embodiment.

FIG. 4 is a cross-sectional view showing a thickness and a length for a side surface extension portion of the insulating member according to an embodiment of the disclosure.

Referring to FIG. 4, certain embodiments provide the length L1 of the upper side surface extension portion 116a extended toward the side of the electrode assembly 110 from the outermost of the upper insulating member 116 may be from about 0.8 mm to about 1.5 mm.

The outermost edge of the electrode assembly 110 is bumped into the inside protrusion portion 124 of the case 120 and therefore, is damaged when the length L1 of the upper side surface extension portion 116a is formed at a length contrary to the embodiments disclosed herein. For example, when the length L1 of the upper side surface extension portion 116a is formed less than 0.8 mm. Further, there is a problem in that a press-fit occurs when seating on the top of the electrode assembly 110 by increase of the length contacting the side surface of the electrode assembly 110 when the length L1 of the upper side surface extension portion 116a is formed at a length contrary to the embodiments disclosed herein. For example, when the length L1 of the upper side surface extension portion 116a is formed in excess of 1.5 mm. Thus, in a typical embodiment the length L1 of the upper side surface extension portion 116a may be extended by from about 0.8 mm to about 1.5 mm toward the side of the electrode assembly 110 from the outermost of the upper insulating member 116

Table 1 below shows correlation of damage of the electrode assembly 110 according to the length of the upper side surface extension portion 116a.

TABLE 1

| division | length of upper side surface extension portion (mm) | damage of electrode assembly |
|---|---|---|
| 1 | 0.6 | Damaged |
| 2 | 0.7 | Damaged |
| 3 | 0.8 | No damage |
| 4 | 0.9 | No damage |
| 5 | 1.0 | No damage |
| 6 | 1.1 | No damage |
| 7 | 1.2 | No damage |
| 8 | 1.3 | No damage |
| 9 | 1.4 | No damage |
| 10 | 1.5 | No damage |
| 11 | 1.6 | Inserting is difficult (press-fit occurs when inserting) |
| 12 | 1.7 | Inserting is difficult |

As shown in Table 1, damage of the electrode assembly 110 is caused when the length of the upper side surface extension portion 116a is 0.6 mm or 0.7 mm. However, damage of the electrode assembly 110 is not caused when the length of the upper side surface extension portion 116a is in the range of 0.8 mm to 1.5 mm.

A press-fit is generated when seating on the top of the electrode assembly 110, or it is impossible to insert when the length of the upper side surface extension portion 116a is 1.6 mm or 1.7 mm.

Further, the thickness of the upper side surface extension portion 116a should be formed thinner than that of the upper insulating member 116. Here, the thickness of the upper side surface extension portion 116a may be formed in the range of 0.1 mm to 0.5 mm. The top side surface extension portion 116a cannot function properly when the thickness of the upper side surface extension portion 116a is formed less than 0.1 mm. Further, an interval between the side of the electrode assembly 110 and the inside side surface of the case 120 is widened, such that the electrode assembly is moved from side to side and may be damaged when applying the shock to the battery when the thickness of the upper side surface extension portion 116a is formed in excess of 0.5 mm.

Figure 5:
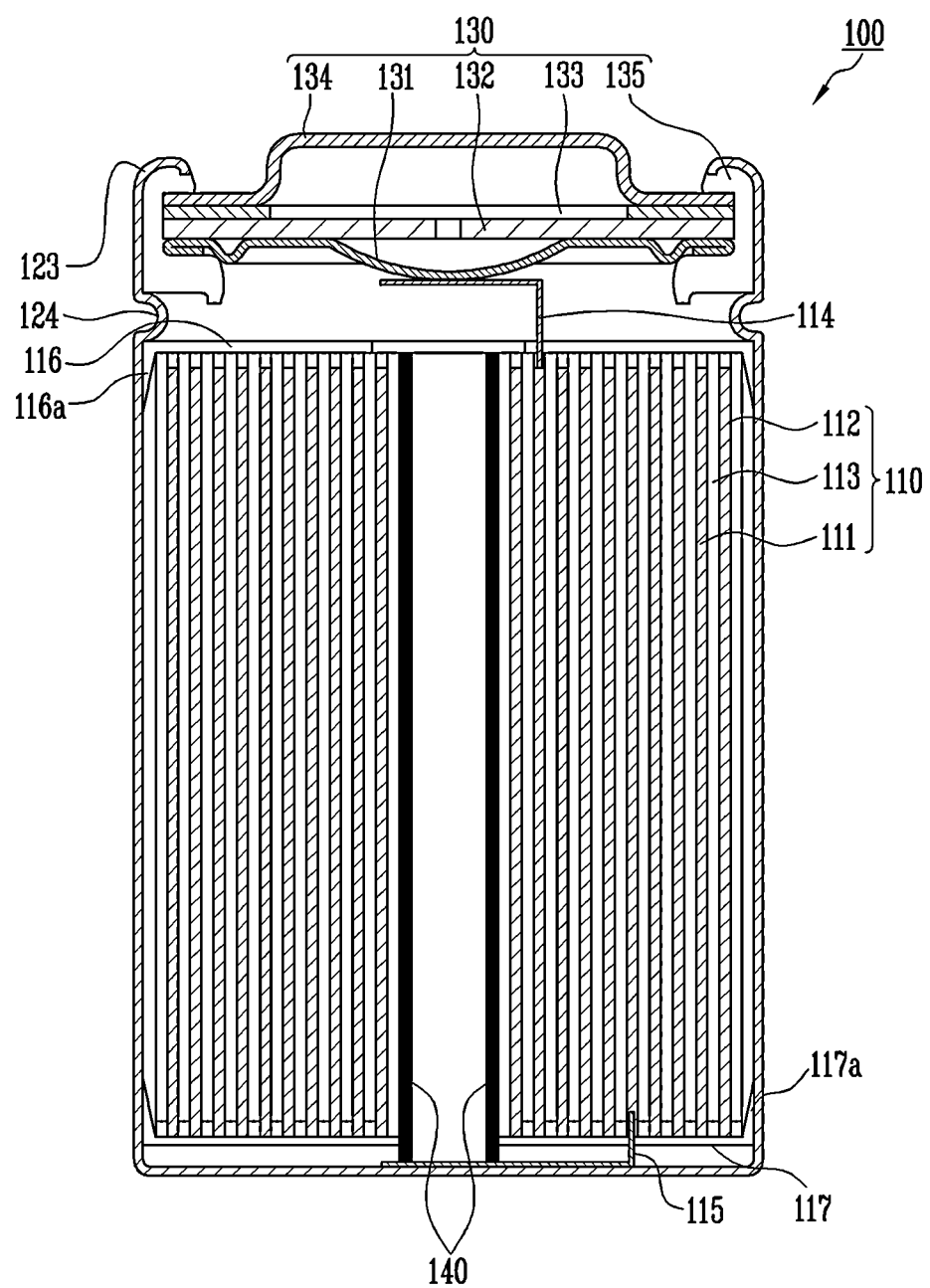
FIG. 5 is a cross-sectional view showing the cylindrical lithium secondary battery according to another embodiment.

FIG. 5 is a cross-sectional view showing the cylindrical lithium secondary battery according to another embodiment.

Referring to FIG. 5, the upper insulating member 116 is formed between the electrode assembly 110 and the cap assembly 130, and a lower insulating member 117 is formed between the electrode assembly 110 and the bottom surface of the case 120. The upper side surface extension portion 116a is formed toward the side surface of the electrode assembly 110 from the outermost of the upper insulating member 116, and the lower side surface extension portion 117a is formed toward the side surface of the electrode assembly 110 from the outermost of the lower insulating member 117.

In certain embodiments, the upper side surface extension portion 116a and the lower side surface extension portion 117a may be extended by 0.8 mm to 1.5 mm toward the side surface of the electrode assembly 110 from the outermost of each of the upper insulating member 116 and the lower insulating member 117. In certain embodiments, the thicknesses of the upper side surface extension portion 116a and the lower side surface extension portion 117a may be formed in the range of 0.1 mm to 0.5 mm.

In certain embodiments, damage of the electrode assembly 110 by shock or vibration may be prevented when the upper insulating member 116 and the lower insulating member 117 in the top and bottom of the electrode assembly 110 are formed with each of the upper side surface extension portion 116a and the lower side surface extension portion 117a. Particularly, damage to the negative plate in the outermost of the top end and the bottom end of the electrode assembly 110 may be prevented. Therefore, the stability of the battery may be improved by blocking the generation of a battery internal short circuit.

In the above-described embodiment, although the cylindrical secondary battery, for example, is described, it is also possible to apply to a square secondary battery.

According to an aspect of the present embodiments, the stability of the battery may be improved by blocking the generation of a battery internal short circuit by preventing the electrode assembly from contacting the inside protrusion portion of the case when subjected to a shock or a vibration.

While the present embodiments have been described in connection with certain exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting this disclosure in any way.

What is claimed is:

1. A secondary battery, comprising:
   an electrode assembly including a first electrode plate, a second electrode plate, and a separator interposed between the first electrode plate and the second electrode plate;
   a case housing the electrode assembly and including an inside protrusion portion formed in the position corresponding to an outer circumference of a top end of a side surface of the electrode assembly;
   a cap assembly coupled with the top of the case;
   and an upper insulating member between the electrode assembly and the cap assembly, said upper insulating member having an upper side surface extension portion and a top surface portion, wherein the materials of the upper side surface extension portion and the top surface portion contain polypropylene;
   wherein the upper side surface extension portion is extended by from 0.8 mm to 1.5 mm from an outermost region of the upper insulating member to correspond to an inside surface of the case facing the side surface of the electrode assembly, wherein the thickness of the upper side surface extension portion is formed in the range of from about 0.1 mm to about 0.5 mm and wherein a thickness of the upper side surface extension portion is formed thinner than that of the top surface portion and a beginning portion of the upper side surface extension portion contacts the top end of the electrode assembly and the upper side surface extension portion gradually spaces apart from the electrode assembly narrowing in a direction away from the top surface portion,
   wherein the upper insulating member contacts each of the first electrode plate and second electrode plate.

2. The secondary battery according to claim 1, wherein the thickness of the upper side surface extension portion is formed in the range of from 0.1 mm to 0.5 mm.

3. The secondary battery according to claim 1, wherein the upper side surface extension portion surrounds a circumference of a top side surface of the electrode assembly in a bottom of the inside protrusion portion.

4. The secondary battery according to claim 1, wherein the upper side surface extension portion may be inclined so that the surface facing the electrode assembly is gradually spaced apart from the electrode assembly toward the bottom thereof.

5. The secondary battery according to claim 1, wherein the material of the upper side surface extension portion and the top surface portion contains polypropylene.

6. The secondary battery according to claim 1, further comprising a lower insulating member between the electrode assembly and the bottom surface of the case,
   wherein the secondary battery includes a lower side surface extension portion extended toward the side surface of the electrode assembly from the outermost region of the lower insulating member.

7. The secondary battery according to claim 6, wherein the lower side surface extension portion is extended by from about 0.8 mm to about 1.5 mm.

8. The secondary battery according to claim 6, wherein the thickness of the lower side surface extension portion is formed in the range of from about 0.1 mm to about 0.5 mm.

9. The secondary battery according to claim 1, wherein the case is formed in a cylindrical shape.

10. The secondary battery according to claim 1, wherein the electrode assembly is wound in a type of cylindrical jelly roll, and a center of the electrode assembly is formed with a constant space.

11. The secondary battery according to claim 10, wherein the constant space may be included with a center pin in a shape of a crossbar formed having a hollowness.

12. The secondary battery according to claim 1, wherein the case contains stainless steel or aluminum material.

13. A secondary battery, comprising:
    a case housing an electrode assembly and including an inside protrusion portion formed in the position corresponding to an outer circumference of a top end of a side surface of the electrode assembly;
    a cap assembly coupled with the top of the case; and
    an upper insulating member formed between the electrode assembly and the cap assembly, said cap assembly including an insulating gasket;
    wherein the upper insulating member is formed with an upper side surface extension portion extended by from 0.8 mm to 1.5 mm from an outermost region of the upper insulting member corresponding to the inside surface of the case facing the side surface of the electrode assembly, wherein the materials of the upper side surface extension portion contain polypropylene, wherein the thickness of the upper side surface extension portion is formed in the range of from about 0.1 mm to about 0.5 mm and a beginning portion of the upper side surface extension portion contacts the top end of the electrode assembly and the upper side surface extension portion gradually spaces apart from the electrode assembly narrowing in a direction away from the top surface portion.

14. The secondary battery according to claim 13, wherein the thickness of the upper side surface extension portion is formed in the range of from 0.1 mm to 0.5 mm.

15. The secondary battery according to claim 14, further comprising a crimping portion extended from the inside protrusion.

16. The secondary battery according to claim 15, wherein the cap assembly includes a safety vent and a circuit substrate.

17. The secondary battery according to claim 16, wherein the safety vent is connected to a positive or negative tab, and wherein the safety vent is configured to release internal gas pressure.

18. The secondary battery according to claim 13, wherein the upper insulating member directly contacts with a top portion of the electrode assembly, and
    wherein the top portion of the electrode assembly is disposed toward the cap assembly.

19. The secondary battery according to claim 18, wherein the upper insulation member has a top surface portion, and
    wherein the top surface portion of the upper insulation member directly contacts with an edge of the separator at the top portion of the electrode assembly.

\* \* \* \* \*